United States Patent
Danel et al.

(10) Patent No.: US 6,356,432 B1
(45) Date of Patent: Mar. 12, 2002

(54) SUPERCAPACITOR HAVING A NON-AQUEOUS ELECTROLYTE AND AN ACTIVE CARBON ELECTRODE

(75) Inventors: Véronique Danel, St Benoit; Jean-Pierre Flipo, Poitiers; Xavier Andrieu, Bretigny sur Orge; Bernadette Pichon, Velizy Villacoublay; Sylvie Barusseau, Bretigny sur Orge, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/221,836

(22) Filed: Dec. 29, 1998

(30) Foreign Application Priority Data

Dec. 30, 1997 (FR) .............................. 97 16663

(51) Int. Cl.[7] .......................... H01G 9/155; H01G 9/00
(52) U.S. Cl. ...................... 361/502; 361/503; 361/523
(58) Field of Search ................. 361/502, 500, 361/503, 523, 524, 525, 527

(56) References Cited

U.S. PATENT DOCUMENTS

| | | | | | |
|---|---|---|---|---|---|
| 4,327,400 A | * | 4/1982 | Muranaka | ................... | 361/502 |
| 4,862,328 A | * | 8/1989 | Morimoto et al. | .......... | 361/502 |
| 5,706,165 A | * | 1/1998 | Saito et al. | ................. | 361/502 |
| 6,246,568 B1 | * | 6/2001 | Nakao et al. | ............... | 361/502 |

FOREIGN PATENT DOCUMENTS

| | | | |
|---|---|---|---|
| EP | 0 680 061 A | | 11/1995 |
| WO | WO98/58397 | * | 12/1998 .......... H01G/9/058 |

* cited by examiner

*Primary Examiner*—Dean A. Reichard
*Assistant Examiner*—Eric Thomas
(74) *Attorney, Agent, or Firm*—Sughrue Mion, PLLC

(57) ABSTRACT

The invention relates to a supercapacitor having a non-aqueous electrolyte and two carbon electrodes each containing a binder and an electrochemically active material constituted by active carbon having a specific surface area greater than about 2000 m²/g. The binder has a mixture of carboxymethylcellulose and a copolymer of styrene and butadiene.

12 Claims, 1 Drawing Sheet

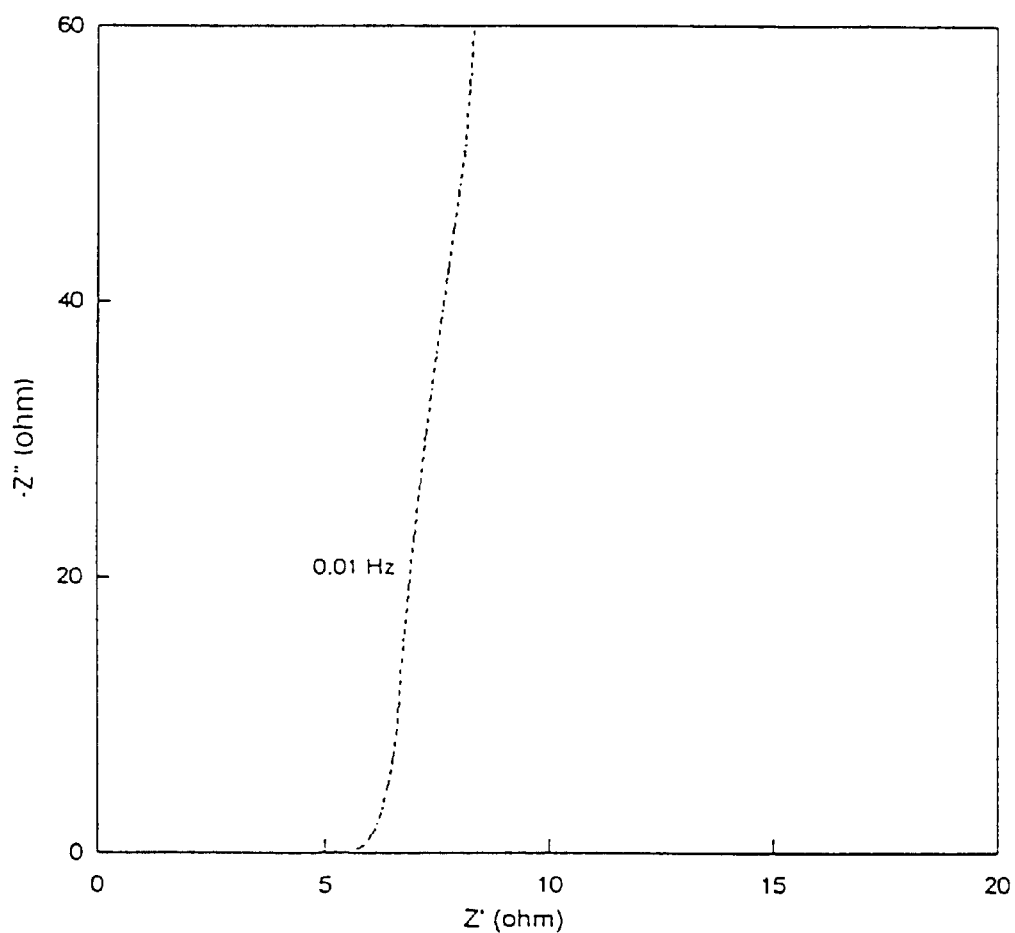

SUPERCAPACITOR HAVING A NON-AQUEOUS ELECTROLYTE AND AN ACTIVE CARBON ELECTRODE

The present invention relates to a supercapacitor comprising a non-aqueous electrolyte and active carbon electrodes of very large specific surface area.

BACKGROUND OF THE INVENTION

Supercapacitors are energy storage devices having high capacitance per unit mass (of the order of several tens of farads per gram (F/g) of active material to about 100 F/g) and high instantaneous specific power.

A supercapacitor comprises two identical electrodes sandwiching a separator that is permeable to the ions of the electrolyte. There are three different types of supercapacitor depending on the structure of their electrodes and the nature of their electrolyte:

- supercapacitors having an organic electrolyte and active carbon electrodes with a large specific surface area lying in the range 1000 $m^2/g$ to 3000 $m^2/g$, and which operate electrostatically;
- supercapacitors having an aqueous electrolyte and transition metal oxide electrodes, which operate essentially on the basis of surface electrochemical reactions, the mean specific surface area of the oxides used being 100 $m^2/g$; and
- supercapacitors having electrodes of electronically conductive polymers such as polypyrrole or polyaniline.

The active carbon electrodes of a conventional non-aqueous electrolyte supercapacitor are thin electrodes obtained by depositing a paste on a current collector. The paste is a mixture of an active material, a diluent, and a binder. Polytetrafluoroethylene (PTFE) is commonly used as the electrode binder.

The binder serves to provide cohesion for the particles of active carbon which is in powder form, but without masking a large fraction of the active surface area.

The binder must also enable the active material to adhere to the current collector.

The binder should confer a certain amount of flexibility to the electrode, particularly while it is being assembled and while it is in operation.

The binder must be inert relative to the components of the electrolyte.

Finally, the insulating binder must enable current to percolate between the grains of active carbon.

In active carbon electrode supercapacitors, it is essential to ensure that the binder does not interact excessively with the grains of active carbon, so as to avoid decreasing the active surface area. A compromise needs to be found so that the binder nevertheless ensures cohesion between the grains of active material.

OBJECTS AND SUMMARY OF THE INVENTION

The object of the present invention is to provide an active carbon electrode supercapacitor having high capacitance per unit mass of the order of about 100 F/g of active material or even more, and having internal resistance that is as low as possible.

Bispo et al. have endeavored (ECS Fall Meeting, October 1995, p. 47) to minimize the internal resistance of a supercapacitor whose electrodes are constituted by a current connector covered in a layer of graphite and then a layer of graphite mixed with Norit® active carbon.

Norit® is an active carbon having a mean specific surface area of about 1100 $m^2/g$.

The particles of the active materials, graphite and Norit® are agglomerated by means of a binder.

Bispo et al. describe that polytetrafluorethylene (PTFE) which is commonly used as a binder gives poor results in terms of internal resistance.

Bispo et al. have shown that cellulose binders such as methylcellulose (MC) or indeed carboxymethylcellulose (CMC) make it possible to reduce the internal resistance of the above-described supercapacitor to a considerable extent.

In particular, a supercapacitor each of whose electrodes contains 15% by weight of CMC presents a capacitance of 60 F/g of active material and an internal resistance of 0.3 $\Omega/dm^2$.

Seeking to increase the capacitance per unit mass of known supercapacitors having active carbon electrodes, the Applicant has implemented active carbons of high specific surface area, i.e. greater than about 2000 $m^2/g$.

A second object of the Applicant is to provide a 2000 $m^2/g$ active carbon electrode supercapacitor that has internal resistance that is as low as possible.

The Applicant has discovered that a binder based on CMC does not give good results with an active carbon of specific surface area greater than about 2000 $m^2/g$ because CMC has too great a covering power or film-generating power and therefore masks too large a fraction of the active surface area, such that the internal resistance of the supercapacitor is too high.

The Applicant has observed that a binder based on a styrene/butadiene (SBR) copolymer provides good cohesion to active carbon having a specific surface area greater than about 2000 $m^2/g$, but cannot be implemented because it provides no adhesion to the current collector.

The present invention thus seeks to obtain a supercapacitor having low internal resistance and high capacitance, including a non-aqueous electrolyte and electrode containing:

- active carbon of high specific surface area; and
- a binder which combines all of the properties discussed above.

That is why the present invention provides a supercapacitor comprising a non-aqueous electrolyte and two carbon electrodes each containing a binder and an electrochemically active material constituted by active carbon having a specific surface area greater than about 2000 $m^2/g$, wherein said binder comprises a mixture of carboxymethylcellulose and a copolymer of styrene and butadiene.

The CMC+SBR binder of the invention makes it possible to improve the capacitance per unit mass of the supercapacitor and to decrease its internal resistance while conserving the adhesive properties of prior art binders such as CMC and PTFE.

The binder of the supercapacitor of the invention advantageously contains a combination of CMC to provide adhesion between the grains of active carbon and a styrene and butadiene copolymer to confer flexibility to the electrode.

The CMC used in the context of the present invention preferably has a mean molecular weight lying in the range about 300,000 and 450,000. Its degree of polymerization is advantageously of the order of 1500 to 2000.

The binder preferably contains 25% to 75% by weight of styrene butadiene copolymer, and 25% to 75% by weight of carboxymethylcellulose relative to 100% by weight of the two polymers.

The electrode advantageously contains at least 80% by weight active carbon and 2% to 20% by weight of binder, and preferably 4% to 10% by weight of binder.

Said electrode can be obtained by the method described below.

The first step of the method consists in fabricating a paste from active carbon and binder put into solution in water.

The following steps consist in spreading the paste on a metal foil made of aluminum, followed by drying in an oven, and then calendaring to obtain the desired porosity, greater than 50% and preferably about 70% to 80%.

The non-aqueous electrolyte of the supercapacitor of the invention contains a solution of a conductive salt dissolved in a solvent selected from: propylene carbonate, ethylene carbonate, butylene carbonate, gamma-butyrolactone, gamma-valerolactone, acetonitrile, propionitrile, glutaronitrile, adiponitrile, methoxyacetonitrile, N,N-dimethylformamide, N,N-dimethylacetamide, N-methylpyrrolidone, N-methyloxazolidinoe, nitromethane, nitroethane, sulfonane, 3-methylsulfonane, dimethylsulfoxide, trimethylphosphate, and mixtures thereof.

The conductive salt is preferably a quaternary ammonium salt, the anion being selected from $BF^-_4$ and $PF^-_6$. The quaternary ammonium is preferably selected from $Me_4N^+$, $Et_4N^+$, $Pr_4N^+$, and $Bu_4N^+$.

BRIEF DESCRIPTION OF THE DRAWING

Other characteristics and advantages of the present invention appear on reading the following examples given as non-limiting illustrations, with reference to the FIGURE which is a curve showing the impedance of a super-capacitor of the invention.

MORE DETAILED DESCRIPTION

The figure is a curve showing the impedance of a super-capacitor.

The abscissa and the ordinate respectively represent the real portion and the imaginary portion of the internal resistance of the supercapacitor, measured in $\Omega$ at a frequency of 0.01 Hz.

EXAMPLE 1

A solution of 2% CMC in water was prepared by mixing 2 g of CMC in 98 g of water. The selected CMC had a molecular weight of about 40,000.

10 g of the solution were added to 0.2 g of a solution comprising 51% SER in water. Thereafter, 4.7 g of MASX-ORB MSC 25® active carbon supplied by KANSAI were added, presenting a specific surface area of 2500 m²/g, together with the appropriate quantity of water to obtain the necessary viscosity for good pasting.

The electrode prepared in that way contained 6% binder.

Two electrodes obtained by that method were mounted in a button cell, using as the electrolyte tetraethyl-ammonium tetrafluoroborate at a concentration of 1 mol/l in acetonitrile.

The impedance curve of the button cell was as shown in the figure.

The capacitance of the button cell obtained was 140 F/g and its internal resistance measured at 0.01 Hz was 7 $\Omega/dm^2$).

EXAMPLE 2

A 2% solution of CMC in water was prepared by mixing 2 g of CMC with 98 g of water. The molecular weight of the selected CMC was about 400,000.

5 g of that solution were added to 0.4 g of a solution comprising 51% SBR in water. Thereafter 4.7 g of MAX-SORB MSC 25® active carbon supplied by KANSAI were added presenting a specific surface area of 2500 m²/g, together with the appropriate quantity of water to obtain the viscosity required for good pasting.

The same electrolyte was used as in Example 1.

The capacitance of the resulting button cell was 150 F/g and its internal resistance measured at 0.01 Hz was 7 $\Omega$ (0.14 $\Omega/dm^2$).

EXAMPLE 3

A button cell was assembled as described in Example 1, by preparing two electrodes each containing 4% CMC binder and 96% carbon having a specific surface area of 2500 m²/g.

The capacitance of the cell was 110 F/g and its internal resistance measured at 0.01 Hz was 16 $\Omega$ (0.32 $\Omega/dm^2$).

EXAMPLE 4

An electrode was prepared as described in Example 1, containing 15% SBR binder and 85% carbon having a specific surface area of 2500 m²/g.

The active material did not adhere to the support, whether the support was a metal foil or an expanded metal. That made it impossible to measure its internal resistance.

What is claimed is:

1. A supercapacitor comprising:
   (A) a non-aqueous electrolyte and
   (B two carbon electrodes each consisting essentially of
      (1) a binder comprising a mixture of carboxymethylcellulose and a copolymer of styrene and butadiene and
      (2) an electrochemically active material constituted by active carbon having a specific surface area greater than 2000 m²/g.

2. A supercapacitor according to claim 1, wherein the binder comprises 25% to 75% by weight carboxymethylcellulose and 25% to 75% by weight of copolymer.

3. A supercapacitor according to claim 1, wherein the electrode contains 2% to 20% by weight of binder.

4. A supercapacitor according to claim 3, wherein the electrode contains 4% to 10% by weight of binder.

5. A supercapacitor according to claim 1, wherein the electrolyte comprises a quaternary ammonium salt, having an anion selected from the group consisting of $BF^-_4$ and $PF^-_6$.

6. A supercapacitor according to claim 1 wherein the electrolyte contains a solution of a conductive salt dissolved in a solvent selected from the group consisting of propylene carbonate, ethylene carbonate, butylene carbonate, gamma-butyrolactone, gamma-valerolactone, acetonitrile, propionitrile, glutaronitrile, adiponitrile, methoxy-aceto-nitrile, N,N-dimethylformamide, N,N-dimethylacetamide, N-methylpyroolidone, N-methyloxazolidone, nitromethane, nitroethane, sulfonane, 3-methylsulfonane, dimethylsulfoxide, trimethylphosphate, and mixtures thereof.

7. A supercapacitor comprising:
   (A) a non-aqueous electrolyte and
   (B) two carbon electrodes each consisting essentially of
      (1) a binder comprising a mixture of carboxymethylcellulose and a copolymer of styrene and butadiene and
      (2) an electrochemically active material constituted by active carbon having a specific surface area greater than 2500 m²/g.

8. A supercapacitor according to claim 7, wherein the binder comprises 25% to 75% by weight carboxymethylcellulose and 25% to 75% by weight of copolymer relative to 100% by weight of the two polymers.

9. A supercapacitor according to claim 7, wherein the electrode contains 2% to 20% by weight of binder.

10. A supercapacitor according to claim 9, wherein the electrode contains 4% to 10% by weight of binder.

11. A supercapacitor according to claim 7, wherein the electrolyte comprises a quaternary ammonium salt, having an anion selected from the group consisting of $BF_4^-$ and $PF_6^-$.

12. A supercapacitor according to claim 7 wherein the electrolyte contains a solution of a conductive salt dissolved in a solvent selected from the group consisting of propylene carbonate, ethylene carbonate, butylene carbonate, gamma-butyrolactone, gamma-valerolactone, acetonitrile, propionitrile, glutaronitrile, adiponitrile, methoxyaceto-nitrile, N,N-dimethylformamide, N,N-dimethylacetamide, N-methylpyrrolidone, N-methyloxazolidone, nitromethane, nitroethane, sulfonane, 3-methylsulfonane, dimethylsulfoxide, trimethylphosphate, and mixtures thereof.

* * * * *